US011766677B2

(12) United States Patent
Zec (10) Patent No.: US 11,766,677 B2
(45) Date of Patent: Sep. 26, 2023

(54) WEAR SENSING LINER (71) Applicant: H-E Parts International Crushing Solutions Pty Ltd, Western Australia (AU)

(72) Inventor: Dragan Zec, Western Australia (AU)

(73) Assignee: H-E Parts International Crushing Solutions Pty Ltd, Western Australia (AU)

( * ) Notice: Subject to any disclaimer, the term of this patent is extended or adjusted under 35 U.S.C. 154(b) by 0 days.

(21) Appl. No.: 17/252,695

(22) PCT Filed: Apr. 16, 2020

(86) PCT No.: PCT/AU2020/050381
§ 371 (c)(1),
(2) Date: Dec. 15, 2020

(87) PCT Pub. No.: WO2020/210875
PCT Pub. Date: Oct. 22, 2020

(65) Prior Publication Data
US 2022/0048037 A1 Feb. 17, 2022

(30) Foreign Application Priority Data
Apr. 18, 2019 (AU) ................. 2019901353

(51) Int. Cl.
*B02C 25/00* (2006.01)
*G01M 5/00* (2006.01)
*G02B 6/02* (2006.01)

(52) U.S. Cl.
CPC .......... *B02C 25/00* (2013.01); *G01M 5/0033* (2013.01); *G01M 5/0091* (2013.01); *G02B 6/02052* (2013.01); *B02C 2210/01* (2013.01)

(58) Field of Classification Search
CPC ..... B02C 25/00; B02C 2210/01; B02C 2/005; B02C 2/02; G01M 5/0033; G01M 5/0091;
(Continued)

(56) References Cited

U.S. PATENT DOCUMENTS 4,646,001 A * 2/1987 Baldwin ............... F16D 66/027
188/1.11 R
5,668,529 A * 9/1997 Kyrtsos ................. F16D 66/021
374/135
(Continued)

FOREIGN PATENT DOCUMENTS

| CL | 52286 B1 | 5/2012 |
|---|---|---|
| CN | 202366764 U | 8/2012 |

(Continued)

OTHER PUBLICATIONS

International Search Report for International Application No. PCT/AU2020/050381, dated May 18, 2020 in 5 pages.
(Continued)

*Primary Examiner* — Son T Le
*Assistant Examiner* — Matthew W. Baca
(74) *Attorney, Agent, or Firm* — Knobbe, Martens, Olson & Bear, LLP (57) ABSTRACT

A wear sensing liner for a comminution apparatus. The wear sensing liner comprising: a liner body comprising; a wear surface side defining a wear surface; and an opposed, operatively rear surface side; and at least one sensor carried by the liner body. The at least one sensor being carried by the liner body to sense wear of the wear surface side of the liner body. The at least one sensor being configured to degrade in response to wear of the wear surface side of the liner body and to output a signal representative of the wear of the wear surface side of the liner body.

20 Claims, 8 Drawing Sheets

(58) Field of Classification Search
CPC ............. G01M 11/083; G02B 6/02052; G02B 6/02309; G02B 6/0239; G02B 6/3624; G02B 6/00; G01N 3/58; G01N 3/56; G01N 21/00; G01B 11/06; G01B 11/22
See application file for complete search history.

(56) References Cited

U.S. PATENT DOCUMENTS

| | | | |
|---|---|---|---|
| 5,939,978 A * | 8/1999 | Kyrtsos | ............... F16D 66/024 188/1.11 R |
| 6,080,982 A | 6/2000 | Cohen | |
| 7,677,079 B2 | 3/2010 | Radziszewski et al. | |
| 2005/0092556 A1* | 5/2005 | Schoppa | ............... B66B 5/0037 188/1.11 R |
| 2011/0169651 A1 | 7/2011 | Mitchell et al. | |
| 2014/0092389 A1* | 4/2014 | Ban | ............... G01M 11/083 356/445 |
| 2016/0107162 A1 | 4/2016 | Busenhart et al. | |
| 2017/0003208 A1* | 1/2017 | Steed | ............... B02C 4/00 |
| 2019/0212213 A1* | 7/2019 | Jia | ............... G01L 1/246 |

FOREIGN PATENT DOCUMENTS

| | | |
|---|---|---|
| CN | 206160984 U | 5/2017 |
| CN | 207204248 U | 4/2018 |
| GB | 2449708 A | 12/2008 |
| WO | 2010/096873 A1 | 9/2010 |
| WO | 2016/033649 A1 | 3/2016 |
| WO | 2019/086577 A1 | 5/2019 |
| WO | 2019/245961 A1 | 12/2019 |

OTHER PUBLICATIONS

Written Opinion for International Application No. PCT/AU2020/050381, dated May 18, 2020 in 7 pages.
International Preliminary Report on Patentability for International Application No. PCT/AU2020/050381, dated Jul. 24, 2020 in 27 pages.

* cited by examiner

WEAR SENSING LINER

CROSS-REFERENCE TO RELATED APPLICATIONS

The present application is the U.S. National Phase under 35. U.S.C. § 371 of International Application PCT/AU2020/050381, filed Apr. 16, 2020, which claims priority from Australian Provisional Patent Application No 2019901353 filed on 18 Apr. 2019, the contents of which are incorporated herein by reference in their entirety.

TECHNICAL FIELD

The present disclosure relates, generally, to the sensing of wear and, more particularly, to a wear sensing liner of a comminution apparatus, the liner being configured to measure at least one wear related physical parameter.

The present disclosure also relates to a system for, and a method of, monitoring wear of the wear sensing liner for a comminution apparatus.

BACKGROUND

Crushers are used in the mining and construction industries for reducing large rocks into smaller rocks, gravel, or grit. Typically, crushers hold rock material between two parallel or angled rigid crushing surfaces and apply force to bring the surfaces together to fracture or deform the rock material. Crushers take various forms including jaw crushers, gyratory crushers, cone crushers, horizontal shaft impactors and vertical shaft impactors.

The crushing surfaces are subjected to rapid wear because of the inherently abrasive action of the rock material. Consequently, each crushing surface is generally lined with at least one wear liner formed from a hardened, wear resistant material. Necessarily, the wear liner is also subjected to wear and must be replaced on a regular basis, leading to process downtime while the crusher undergoes maintenance which results in reduced productivity.

Due to the unpredictable nature of wear rate, it is necessary to monitor ongoing wear of the wear liner during its operational life. Such monitoring requires the cessation of operation of the crusher to conduct a visual inspection of wear. This is a time consuming task that also leads to lost productivity and revenue.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

According to a first aspect of the disclosure, there is provided a wear sensing liner for a comminution apparatus, the wear sensing liner comprising:
a liner body comprising;
a wear surface side defining a wear surface;
an opposed, operatively rear surface side; and
an insert; and
at least one sensor carried by the liner body, the at least one sensor being carried by the liner body to sense wear of the wear surface side of the liner body, the at least one sensor being configured to degrade in response to wear of the wear surface side of the liner body and to output a signal representative of the wear of the wear surface side of the liner body;
wherein the at least one sensor comprises a rigid sleeve configured to mount the at least one sensor to the liner body, and
wherein the insert is configured to receive the rigid sleeve when the at least one sensor is mounted to the liner body.

In some embodiments, a distal end of the at least one sensor is aligned with the wear surface of the liner body.

In some embodiments, the output signal corresponds to a physical parameter associated with the liner body, the physical parameter being representative of the wear of the wear surface side of the liner body.

In some embodiments, the physical parameter is a depth of the liner body in a region of the at least one sensor.

In some embodiments, the at least one sensor is an optical fibre sensor.

In some embodiments, the at least sensor comprises an optical fibre core.

In some embodiments, the wear sensing liner further comprises an electromagnetic radiation source configured to generate light that is directed through the optical fibre core of the at least one sensor.

In some embodiments, the optical fibre core of the at least one sensor comprises at least one dielectric mirror located at a known position along a length of the optical fibre core.

In some embodiments, the signal output by the at least one sensor comprises reflected light.

In some embodiments, the at least one dielectric mirror is configured to reflect a specified wavelength of the light, thereby producing the reflected light.

In some embodiments, the at least one sensor comprises a plurality of dielectric mirrors arranged at spaced intervals along the optical fibre core.

In some embodiments, the specified wavelength of each dielectric mirror is different to each other specified wavelength.

In some embodiments, the at least one sensor comprises a printed circuit board comprising a sensing circuit configured to wear with wear of the liner body.

In some embodiments, the sensing circuit comprises a plurality of impedance elements arranged in parallel and positioned at known positions along a length of the at least one sensor.

In some embodiments, the at least one sensor is configured to be received within an opening defined by the liner body.

In some embodiments, the sleeve is configured to mount the at least one sensor to the liner body with a mechanical connection.

In some embodiments, the at least one sensor is configured to be connected to the liner body with an adhesive.

In some embodiments, the insert is configured to be positioned with respect to the liner body during fabrication of the wear sensing liner.

In some embodiments, the insert is configured to melt at a higher temperature than the material(s) constituting the liner body, such that the insert can be positioned in the liner body when the liner body is formed.

In some embodiments, the wear sensing liner comprises a plurality of sensors, wherein the plurality of sensors are arranged in an array with respect to the liner body so as to indicate mechanical degradation across the liner body.

In some embodiments, the wear sensing liner comprises a data recorder configured to communicate with the at least one sensor, the data recorder comprising:
 a processor; and
 a memory storing program instructions accessible by the processor, and configured to cause the processor to:
  determine data representative of wear of the liner body extracted from the signal, and
  store the data in the memory.

According to a second aspect of the disclosure, there is provided a wear sensing system for a comminution apparatus, comprising:
 the wear sensing liner as defined above; and
 a computing device;
 wherein the wear sensing liner is configured to communicate with the computing device using a communications network.

In some embodiments, the computing device is configured to generate a control signal configured to deactivate the comminution apparatus or change a comminution apparatus operating parameter.

In some embodiments, the computing device is configured to determine an indication of wear of the wear sensing liner.

In some embodiments, the computing device is configured to determine a wear rate of the wear sensing liner.

In some embodiments, the computing device is configured to determine an estimated remaining lifetime of the wear sensing liner.

In some embodiments, the computing device is configured to generate an alarm when the determined wear is equal to or less than a wear threshold.

In some embodiments, the computing device is configured to generate an alarm when the wear rate is equal to or greater than a wear rate threshold.

In some embodiments, the computing device is configured to generate an alarm when the estimated remaining lifetime is equal to or less than a lifetime threshold.

In some embodiments, the computing device is configured to transmit the control signal to a comminution controller of the comminution apparatus when the determined wear is equal to or less than a wear threshold, thereby deactivating the comminution apparatus, or changing the comminution apparatus operating parameter.

In some embodiments, the computing device is configured to transmit the control signal to a comminution controller of the comminution apparatus when the wear rate is equal to or greater than a wear rate threshold, thereby deactivating the comminution apparatus, or changing the comminution apparatus operating parameter.

In some embodiments, the computing device is configured to transmit the control signal to a comminution controller of the comminution apparatus when the estimated remaining lifetime is equal to or less than a lifetime threshold, thereby deactivating the comminution apparatus, or changing the comminution apparatus operating parameter.

According to a third aspect of the disclosure, there is provided a comminution apparatus comprising the wear sensing liner as defined above, or the wear sensing system as defined above.

According to a fourth aspect of the disclosure, there is provided a wear sensing liner for a comminution apparatus, the wear sensing liner comprising;
 a liner body;
 one or more fibre sensors inserted into the liner body from a rear surface thereof to a predetermined depth from a wear surface of the liner body;
 wherein the one or more sensors is configured to produce a signal corresponding to one or more physical parameters associated with the wear surface of the liner body, whereby a change in the signal is in response to mechanical degradation of the wear surface during operation of the comminution apparatus.

In some embodiments, the fibre sensor comprises an optical fibre having one or more fibre Bragg gratings.

In some embodiments, the fibre sensor is provided with a rigid sleeve for housing a portion of the fibre sensor.

In some embodiments, the rigid sleeve may have a distal end located at or proximal to the rear surface of the liner body.

In some embodiments, the rigid sleeve may be configured to be threadedly engaged with a threaded recess in the liner body.

In some embodiments, the rigid sleeve may be configured to be inserted into a recess in the liner body and retained therein with an adhesive material.

In some embodiments, the rigid sleeve may comprise a material having a higher melting point than a castable material from which the liner body is cast, thereby allowing the rigid sleeve to be embedded in the liner body when the liner body is cast.

In some embodiments, a plurality of fibre sensors are arranged in an array with respect to the liner body so as to monitor mechanical degradation across the wear surface during operation of the comminution apparatus.

In some embodiments, the wear sensing liner further comprises a data recorder configured to record the signal(s) from the one or more fibre sensors.

In some embodiments, the data recorder may be configured to record the signal(s) from the one or more fibre sensors in real time or near real time.

In some embodiments, the wear sensing liner further comprises an antenna configured to transmit the signal(s) to a remote device.

In some embodiments, the antenna may be configured to transmit the signal(s) from the one or more fibre sensors in real time or near real time.

According to a fifth aspect of the present disclosure, there is provided a wear monitoring system for monitoring wear of a wear liner for a comminution apparatus, the wear monitoring system comprising:
 a wear sensing liner, as defined above, arranged to cover or line a crushing surface of the comminution apparatus, wherein the wear sensing liner is configured to produce a signal corresponding to one or more physical parameters associated with a wear surface of a liner body, whereby a change in the signal is in response to mechanical degradation of the wear surface during operation of the comminution apparatus; and
 a remote device configured to receive the signal(s) produced by the wear sensing liner and determine an extent of wear and/or wear rate of the wear surface.

In some embodiments, the extent of wear and/or the wear rate may be displayed on a graphical user interface display of the remote device.

In some embodiments, the remote device may be further configured to receive the signal(s) in a real time or near real time.

In some embodiments, the remote device may be further configured to determine and display the one or more physical parameters related to the extent of wear and/or the wear rate of the wear surface.

In some embodiments, the remote device may be further configured to determine and display an estimated time to failure of the wear sensing liner.

In some embodiments, the remote device may be further configured to generate an alarm when the extent of wear reaches a predetermined wear threshold.

According to a sixth aspect of the disclosure, there is provided a method of monitoring wear of a wear liner for a comminution apparatus, the method comprising:

covering or lining a crushing surface of the comminution apparatus with a wear sensing liner as defined above;

operating the comminution apparatus, thereby mechanically degrading a wear surface of the wear sensing liner, whereby the wear sensing liner produces a signal corresponding to one or more physical parameters associated with the wear surface of a liner body, whereby a change in the signal is in response to mechanical degradation of the wear surface during operation of the comminution apparatus;

receiving the signal at a remote device; and determining, by the remote device, an extent of wear and/or wear rate of the wear surface.

In some embodiments, the method further comprises predicting time to failure from the extent of wear and/or the wear rate.

In some embodiments, of the method further comprises replacing the wear sensing liner prior to the predicted time to failure.

In some embodiments, the method further comprises displaying the extent of wear and/or wear rate as a graphical representation.

In some embodiments, the receiving and displaying steps may be performed in real time or near real time.

BRIEF DESCRIPTION OF DRAWINGS

Embodiments of the disclosure will now be described by way of example with reference to the accompanying drawings in which.

DETAILED DESCRIPTION OF EXEMPLARY EMBODIMENTS

Figure 1A:
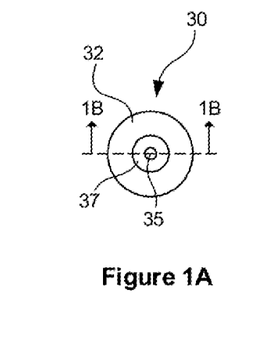
FIG. 1A is a schematic, end view of a first embodiment of a sensor.
Figure 1B:
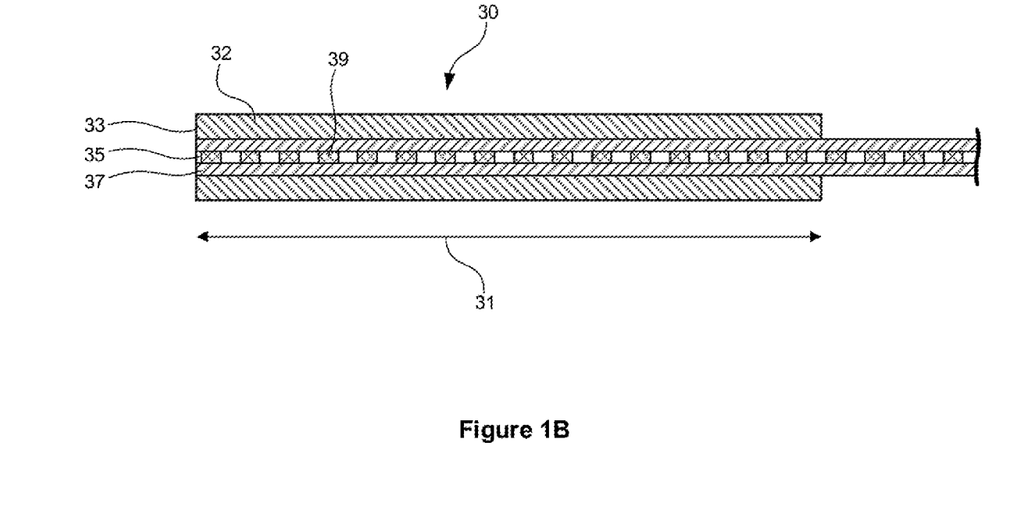
FIG. 1B is a schematic, sectional, side view of the sensor taken along line 1B-1B in FIG. 1A of the drawings.

FIGS. 1A and 1B illustrate a first embodiment of a sensor 30 for use in monitoring wear of a wear sensing liner, as will be described in greater detail below. The sensor 30 is configured to sense a physical parameter and to produce a signal indicative of the physical parameter being sensed. Examples of the physical parameter sensed include a depth of the wear sensing liner in which the sensor is mounted in use, strain, temperature, pressure, vibration or the like.

In all cases, the sensor 30 monitors the physical parameter at a distal end 33 of the sensor 30. As will be described in greater detail below, the sensor 30 is a sacrificial sensor and degrades over time by being shortened as the wear sensing liner in which the sensor 30 is mounted wears in use. Thus, it will be appreciated that the distal end 33 of the sensor 30 will transit up towards a proximal end of the sensor 30 with time, i.e. the effective length of the sensor 30 is shortened.

In the embodiment shown in FIGS. 1A and 1B of the drawings, the sensor 30 is a fibre optic sensor and comprises an optical fibre core 35. The optical fibre core 35 is configured to transmit and reflect electromagnetic radiation between a first end and a second end of the optical fibre core 35. The optical fibre core 35 may be an elongate length of transparent silica or polymer, for example.

The optical fibre core 35 is radially surrounded by a protecting portion, or sheath 37. The sheath 37 comprises one or more of a cladding with a lower index of refraction than the optical fibre core 35, a coating, a strengthening portion configured to provide strength and/or rigidity to the optical fibre core, and an outer jacket.

The sensor 30 comprises a rigid sleeve 32 surrounding the sheath 37. The sleeve 32 houses at least a portion of the sensor 30. The sleeve 32 is configured to facilitate mounting of the sensor 30 within a bore of the wear sensing liner. The sleeve 32 has an external thread to enable it to be threadedly engaged with the correspondingly, internally threaded bore of the wear sensing liner. In other embodiments (not shown), the sleeve 32 is configured to be a press fit or a snap fit in the bore of the wear sensing liner. Further, in some embodiments (not shown), the sleeve is 32 is mounted in the bore of the wear sensing liner and retained in the bore with an adhesive.

The sensor 30 is configured to be connected to an electromagnetic radiation source (not shown) in the form of a light source. The light may be in the form of visible light. The light source generates light and directs the light through the optical fibre core 35.

The sensor 30 comprises a plurality of dielectric mirrors 39 arranged at longitudinally spaced intervals within the optical fibre core 35. Each dielectric mirror 39 may be in the form of an electromagnetic radiation filter, light filter or, instead, a distributed reflector. The dielectric mirrors 39 are positioned at known, spaced positions along the length of the optical fibre core 35. In other words, the spacing between adjacent dielectric mirrors 39 is known.

The dielectric mirrors 39 are evenly spaced along the length of the optical fibre core 35, as illustrated in FIG. 1B. In another embodiment (not shown), the dielectric mirrors 39 may be irregularly spaced along the length of the optical fibre core 35. For example, a density of the dielectric mirrors 39 towards the distal end 33 (a distal density) may be greater than a density of the dielectric mirrors 39 towards the other, proximal end (a proximal density). Alternatively, the density of the dielectric mirrors 39 towards the distal end 33 may be less than the density of the dielectric mirrors 39 towards the other, proximal end. Increasing the density of dielectric mirrors 39 improves the resolution of the sensor 30.

Each dielectric mirror 39 is configured to reflect a specified wavelength, or a specified range of wavelengths of light, whilst transmitting the remaining wavelengths, thereby producing reflected light. In some embodiments, the wavelength, or range of wavelengths of light associated with each dielectric mirror 39 (that is, the wavelength, or range of wavelengths reflected by that dielectric mirror 39), differs from the wavelengths, or range of wavelengths, of light associated with any other dielectric mirror 39 of the sensor 30. In other words, each of the dielectric mirrors 39 is configured to reflect a different specified wavelength or specified range of wavelengths.

When the light source directs light through the optical fibre core 35, each dielectric mirror 39 reflects a portion of that light. The reflected light forms at least a part of the signal produced by the sensor 30. The reflected light comprises a superposition of the wavelengths of light reflected by each dielectric mirror 39. The resolution of the sensor 30 therefore corresponds with the separation of adjacent dielectric mirrors 39.

As previously described, the sensor 30 is configured to detect wear along its length 31. As the sensor 30 wears along its length 31, the dielectric mirrors 39 will also be sequentially worn away. As each dielectric mirror 39 is worn away, the reflected light representative of the superposition of the wavelengths of light reflected by each dielectric mirror 39 of the sensor 30 will change. The absence of the specified wavelength(s) associated with a particular dielectric mirror 39 contributing to the superposition, and the known position of that dielectric mirror 39 along the length of the optical fibre core 35 indicates wear of the sensor 30 at least to that known position. The wear rate of the sensor 30 can also be determined by associating the wear between two or more dielectric mirrors 39 with a measured time frame.

In an embodiment, each dielectric mirror 39 is in the form of a fibre Bragg grating. That is, the optical fibre core 35 of each sensor 30 contains a plurality of longitudinally spaced fibre Bragg gratings positioned at known locations along the length of the optical fibre core 35. The inclusion of fibre Bragg gratings in the optical fibre core 35, causes the reflection of particular wavelengths of light (the superposition of which forms a Bragg wavelength) while allowing the transmission of the remaining wavelengths. A reflected peak is measured and compared to a control peak for variations that can be attributed to the physical parameter and/or changes in the physical parameter (e.g. depth or thickness of the wear sensing liner, temperature, strain, pressure, vibration, or the like).

The physical parameter and changes in the physical parameter can be determined by measuring the signal comprising the reflected light. The physical parameter changes can be determined by measuring the changes in the wavelengths of the reflected light, or changes in the superposition of the reflected light, for example, shifts in the Bragg wavelength. These changes in the wavelengths of the reflected light, or changes in the superposition of the reflected light can then be converted to values representing the physical parameter. In an example, the superposition of the reflected light shifts when the respective sensor 30 encounters a change in temperature, such as an increase in temperature. This shift can be detected, and used to determine the change in temperature.

When multiple fibre Bragg gratings are included in each optical fibre core 35, each fibre Bragg grating is configured to reflect different wavelengths of electromagnetic radiation as previously described, producing a multiplexed signal. In an example, as the sensor 30 is worn away and reduces in length, fibre Bragg gratings are consecutively destroyed from the distal end 33 of the optical fibre core 35 of the sensor 30. This leads to a cessation of their respective reflected Bragg wavelengths. As the spacing between each fibre Bragg grating is known, the extent of wear of the sensor 30 may be easily determined. Additionally, the wear rate may be easily determined by associating the extent of wear with a measured time frame.

The sensor 30 is advantageously resistant to electromagnetic and radio frequency interference. Furthermore, the sensor 30 is resistant to chemicals, radioactivity, corrosion, and lightning. The sensor 30 has a high sensitivity, produces a high resolution signal and is highly responsive. The sensor 30 can be manufactured in a small form-factor, and can be easily connected to other components. The sensor 30 advantageously allows for the measurement of wear, temperature, strain and/or pressure via a reduction in the length 31 of the sensor 30.

Figure 2:
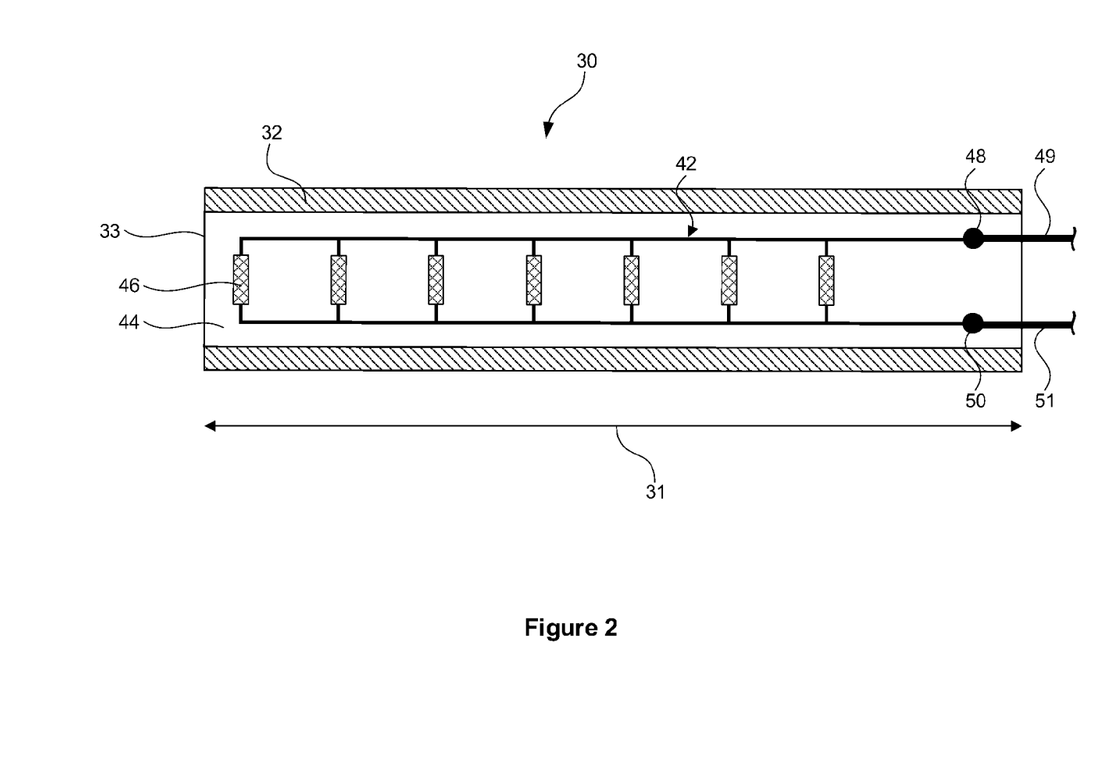
FIG. 2 is a schematic, cross sectional view of a second embodiment of a sensor.

FIG. 2 illustrates a cross section of another embodiment of the sensor 30 to sense the physical parameter. With reference to FIGS. 1A and 1B, like reference numerals refer to like parts unless otherwise specified.

The sensor 30 comprises a printed circuit board (PCB) 44. The PCB 44 carries a sensing circuit 42 comprising a plurality of electrical impedance elements, each in the form of a resistor, 46, arranged in parallel. Opposed ends 48, 50 of the sensing circuit 42 are connected to conductors 49, 51, respectively, for connection to a signal processing module 61 (illustrated in FIG. 8). In some embodiments, the PCB 44 is in the form of a flexible printed circuit. The sensor 30 may comprise a power source (not shown), for example, a battery, that is configured to power the sensor 30 and to allow the determination of a characteristic of the sensing circuit 42.

Each resistor 46 has a known impedance. The impedance of each resistor 46 may be the same as each other resistor 46. Alternatively, the impedances of the resistors 46 may differ from one another. Each resistor 46 is positioned at a known position along the length of the sensor 30. Furthermore, the spacing between adjacent resistors 46 is known.

The resistors 46 are evenly spaced along the length of the PCB 44, as illustrated in FIG. 2. In another embodiment (not shown), the resistors 46 may be irregularly spaced along the length of the PCB 44. For example, a density of the resistors 46 towards the distal end 33 (a distal density) may be greater than a density of the resistors 46 towards the other, proximal end (a proximal density) of the PCB 44. Alternatively, the density of the resistors 46 towards the distal end 33 may be less than the density of the resistors 46 at the other end. Increasing the density of resistors 46 improves the resolution of the sensor 30.

The sensor 30 comprises the rigid sleeve 32 housing an elongate portion of the PCB 44. As with the previous embodiment, the sleeve 32 facilitates mounting of the sensor 30 within a bore of the wear sensing liner. The sleeve 32 has an external thread to enable it to be threadedly engaged with the correspondingly, internally threaded bore of the wear sensing liner. In other embodiments (not shown), the sleeve 32 is configured to be a press fit or a snap fit in the bore of the wear sensing liner. Further, in some embodiments (not shown), the sleeve is 32 is mounted in the bore of the wear sensing liner and retained in the bore with an adhesive.

As previously described, the sensor 30 is configured to produce a signal indicative of the physical parameter. As the sensor 30 is worn down by abrasion of the wear sensing liner in which it is mounted, the distal most resistor 46 will also be destroyed by being worn away. As each distal resistor 46 is worn away, the impedance of the sensing circuit 42 changes. The impedance of the sensing circuit 42 is therefore indicative of the length of the sensor 30 and is therefore also indicative of wear of the sensor 30. Thus, when the impedance of the sensing circuit 42 indicates that a particular resistor 46 has been worn away, it is able to be inferred that the length of the sensor 30 has worn to at least that known position. The resolution of the sensor 30 therefore corresponds with the separation of adjacent resistors 46. The wear rate of the sensor 30 can be determined by associating the wear between two or more resistors 46 with a measured time frame.

In an embodiment, particularly where the sensor 30 is to communicate wirelessly, the sensor 30 comprises a power source (not shown), for example, a battery. As will be described in greater detail below, the sensor 30 communicates with a signal processing module and, optionally, a wireless communications system. The sensor 30 may wirelessly transmit a data set generated by the sensor 30. The complete data set may comprise a representation of the signal over time. In order to reduce power consumption, the sensor 30 may transmit an indication of a change in the signal and/or the physical parameter when detected, rather than transmitting the complete data set generated by the sensor 30. Advantageously, this significantly reduces the amount of data transmitted, and the power consumption of the sensor 30.

In an embodiment, the sensor 30 is configured to sense an alternative physical parameter. For example, the physical parameter sensed may comprise temperature, strain, vibration, pressure, or the like. Each impedance element 46 may be in the form of a thermistor, a strain gauge, a vibration sensor, or a pressure sensor. Alternatively, the sensor 30 comprises one or more sensing elements in addition to the impedance elements 46. The sensing circuit 42 may comprise each sensing element. Each of the sensing elements is positioned at a known position along the length of the sensor 30, as described with reference to the impedance elements, and therefore, the sensing elements provide an indication of the physical parameter along the length 31 of the sensor 30.

The described sensor 30 advantageously allows for the provision of a wireless sensor 30 that can be used in difficult to access areas, or components. For example, the sensor 30 may comprise an antenna for wireless communication with remote units. The battery powers the sensing circuit 42 and the antenna, and provides, for example, a 3 to 6 month lifespan, allowing the sensor to operate without maintenance for an extended period of time.

A wear liner is designed and manufactured to be sacrificially worn instead of the crushing surface of a comminution apparatus. It is useful for an operator or a site supervisor to monitor the extent of wear and/or the wear rate of the wear liner during its operational life and to determine when the wear liner requires replacement. Additionally, it is useful to be informed of physical parameters that may affect the extent of wear and/or the wear rate of the wear liner. It will be appreciated by those skilled in the art that a reference to a wear liner as used herein may also apply to a wear plate.

Figure 3:
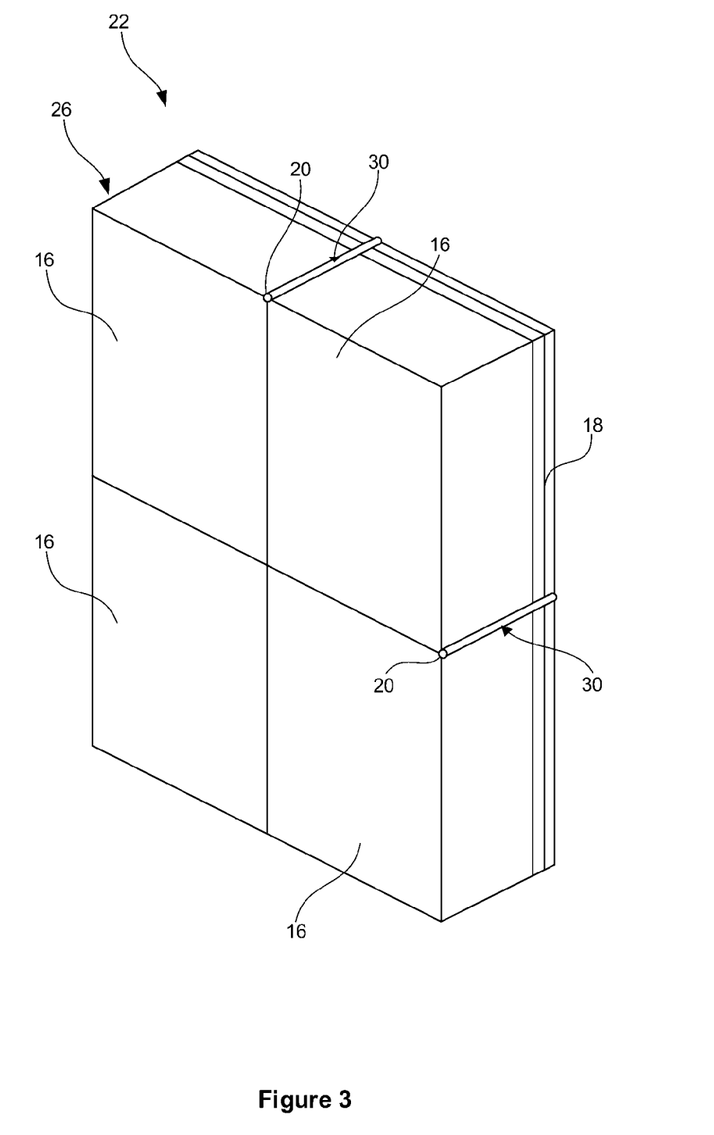
FIG. 3 is a perspective view of a first embodiment of a wear sensing liner configured as a wear plate.

FIG. 3 shows a first embodiment of a wear sensing liner 22. The wear sensing liner 22 is configured as a wear plate for a hopper. The wear sensing liner 22 includes a liner body 26. The wear sensing liner 22 also includes a plurality of sensors 30, as described above. The wear sensing liner 22 may comprise, for example, a plurality of the sensors 30 described with reference to FIGS. 1A and 1B, a plurality of the sensors 30 described with reference to FIG. 2, or some combination thereof.

The liner body 26 comprises a plurality of rigid tiles 16. In general, the tiles 16 are polygonal, such as rectangular, triangular, hexagonal, or another shape. The liner body 26 comprises a base 18. Each sensor 30 is received within a hole 20 or opening. Each hole 20 is located at a corner of abutting tiles 16. The plurality of holes 20 are formed during fabrication of the liner body 26 (e.g. by casting) or, instead, are formed, for example, by drilling, after the fabrication of the liner body 26. Each sensor 30 is received in its associated hole 20 from an operatively rear surface of the base 18. In this particular embodiment, each sensor 30 extends substantially through the entire depth of the liner body 26.

Figure 4:
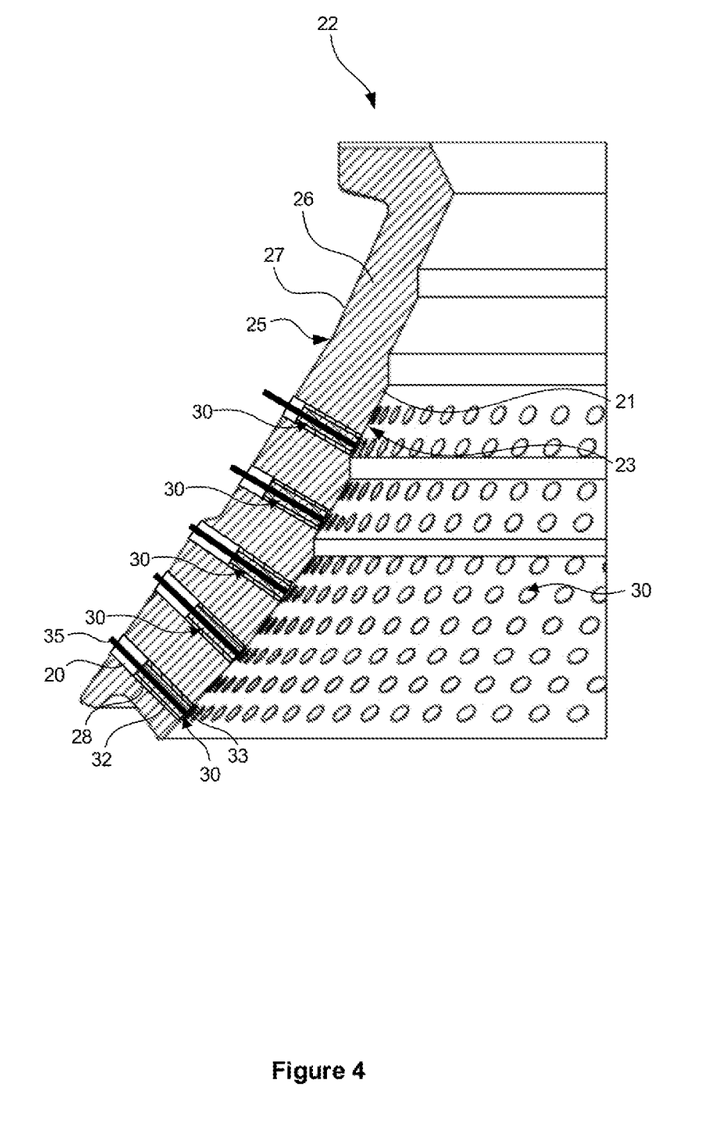
FIG. 4 is a cross sectional view of a part of a second embodiment of a wear sensing liner configured as a bowl liner of a cone crusher.

FIG. 4 shows an embodiment of a wear sensing liner 22 for a comminution apparatus 90 (FIG. 8) in the form of a cone crusher. More particularly, the wear sensing liner 22 is for a bowl or shell of the cone crusher. The wear sensing liner 22 comprises a liner body 26. The liner body 26 comprises a wear surface side 23 and an operatively rear surface side 25. The wear surface side 23 defines a wear surface 21 and the rear surface side 25 defines a rear surface 27.

The body 26 of the wear sensing liner 22 defines a plurality of holes 20. Each of the plurality of holes 20 spans at least a portion of a depth of the liner body 26. In the illustrated embodiment, each of the plurality of holes 20 spans the entire depth of the liner body 26. That is, each of the plurality of holes 20 extends from the wear surface side 23 to the rear surface side 25 of the liner body 26. Once again, the holes 20 are formed during fabrication, for example during casting, of the liner body 26 or, instead, are formed, for example, by drilling, after fabrication.

An insert 28 is received in each hole 20 of the liner body 26 of the wear sensing liner 22. In an embodiment, each insert 28 is threadedly inserted into a respective hole 20 of the liner body 26. Each insert 28 thus provides a securing point for a respective sensor 30. A wear surface end (e.g. a distal end) of each insert 28 is flush with the wear surface 21 of the liner body 26. As illustrated, one or more of the inserts 28 partially spans the depth of the liner body 26, the relevant insert/s 28 terminating short of the rear surface 25 of the liner body. Instead, one or more of the inserts 28 may span the entire depth of the liner body 26. That is, the relevant insert 28 may extend from the wear surface side 23 of the liner body 26 to the rear surface side 25. Therefore, those inserts 28 may also be flush with the rear surface 27 of the liner body 26.

Drilling the holes 20 in the liner body 26 can result in localised regions of weakness. Therefore, in some embodiments, each insert 28 is positioned with respect to the liner body 26 during fabrication of the wear sensing liner 22. For example, the liner body 26 may be cast from a castable liner body material. Each insert 28 may be positioned within a liner body mould before the liner body 26 is cast. Each insert 28 is configured to melt at a higher temperature than the liner body material. For example, each insert 28 may comprise tungsten carbide which has a greater than the melting point of the liner body 26 material. The liner body 26 is therefore able to be cast with each insert 28 in-situ.

The wear sensing liner 22 comprises a plurality of sensors 30 which are carried by the liner body 26. Each sensor 30 is configured to sense wear of the wear surface side 23 of the liner body 26 in a region of the respective sensor 30. Each sensor 30 is further configured to degrade in response to wear of the wear surface side 23 of the liner body 26 and, thus, each sensor 30 functions as a sacrificial sensor.

The sensors 30 are arranged in an array with respect to the liner body 26, so as to monitor mechanical degradation across the wear surface side 23 of the liner body 26. It is understood that, being arranged in an array, may comprise the sensors 30, for example, being positioned in known positions across the liner body 26. The positioning of each sensor 30 in the array may be regular, (e.g. a spacing between adjacent sensors 30 may be consistent), or may be irregular. For example, a higher density of sensors 30 may be positioned in regions of the liner body 26 that are expected to experience the greatest wear, so that those regions are able to be better monitored. For example, a lower portion density of the sensors 30, being the density of the sensors 30 in an operatively lower portion of the liner body 26, may be greater than a higher portion density of the sensors 30, being the density of the sensors 30 in an operatively higher portion of the liner body 26, or vice versa.

As described above, each sensor 30 comprises a rigid sleeve 32 housing at least a portion of the respective sensor 30. Each sleeve 32 mounts its respective sensor 30 to the liner body 26 by being received in an associated insert 28. In an embodiment, the rigid sleeve 32 has an external thread to enable it to be threadedly engaged within its associated insert 28. In other embodiments (not shown), each sleeve 32 may connect to its associated insert 28 with a press fit or a snap fit. Further, in some embodiments (not shown), each sleeve 32 may be secured within its associated insert 28 with an adhesive.

Each sensor 30 is inserted into the liner body 26 from the operatively rear surface side 25 of the liner body 26 by threading the rigid sleeve 32 into its associated insert 28. Each sensor 30 is inserted such that a wearing end (i.e., the distal end 33) of each sensor 30 is aligned with the wear surface 21 of the liner body 26. The length of each sensor 30 substantially spans the depth of the liner body 26. Each sleeve 32 has a proximal end located at, or towards, the rear surface side 25 of the liner body 26. The proximal end of each sleeve 32 may lie substantially flush with the rear surface 27 of the liner body 26.

As previously described, each sensor 30 is operative to produce a signal representative of wear of the wear surface side 23 of the liner body 26 by monitoring a depth of the liner body 26 in a region of the respective sensor 30. A change in the signal output by any one of the sensors 30 results from mechanical degradation of the wear surface side 23 around the sensor 30 and, likewise, the respective sensor 30, during operation of the comminution apparatus 90.

As previously described, in an embodiment, the wear sensing liner 22 carries a plurality of the sensors 30 of FIGS. 1A and 1B of the drawings. Each of the sensors 30 is connected to the light source. Each sensor 30 is positioned at a known position with respect to the liner body 26. Therefore, the position of each dielectric mirror 39 with respect to the liner body 26 is known, as is the position of each dielectric mirror 39 with respect to the wear surface 25. The sensor 30 is responsive to wear along its length and, therefore, is configured to detect wear of the liner body 26 when carried by the liner body 26.

As each dielectric mirror 39 is worn away with wear of the wear surface side 23 of the liner body 26, the specified wavelength, or range of wavelengths, reflected by that dielectric mirror 39 will no longer be reflected. The reflected light, being the superposition of the wavelengths of light reflected by each dielectric mirror 39 of the sensor 30 will therefore also change. The known position of that dielectric mirror 39 along the length of the optical fibre core 35 results in the sensor outputting a signal indicative of wear of the liner body 26 at least to that known position. The wear rate of the liner body 26 can also be determined by associating the wear between two or more dielectric mirrors 39 with a measured time frame. As the liner body 26 comprises a plurality of sensors 30, the wear of the liner body 26 can be mapped across the wear surface side 23.

In another example, the superposition of the reflected electromagnetic radiation (e.g. the Bragg wavelength) shifts when the respective sensor 30 encounters a change in temperature, such as an increase in temperature. The change in temperature may then be associated with an external force acting upon the wear sensing liner 22. This external force is indicative of mechanical degradation of the liner body 26. Furthermore, the superposition of the reflected electromagnetic radiation changes when the sensor 30 is exposed to a change in pressure, such as an increase in pressure. The change in pressure may be determined and may be associated with an external force acting upon the wear sensing liner 22. This external force is again indicative of mechanical degradation of the liner body 26. Additionally, the superposition of the reflected light changes when a force is applied to the sensor 30 causing strain. The strain may be determined, and may be associated with the force acting upon the wear sensing liner 22. This force is also indicative of mechanical degradation of the liner body 26.

As previously described, in another embodiment, the wear sensing liner 22 comprises a plurality of the sensors 30 of FIG. 2 of the drawings. Each sensor 30 is positioned at a known position with respect to the liner body 26. Therefore, the position of each resistor 46 with respect to the liner body 26 is known, as is the position of each resistor 46 with respect to the wear surface 25.

Each sensor 30 is positioned, in use, in the liner body 26 such that a distal end of the PCB 44 of the sensor 30 is aligned with the wear surface 21 of the liner body 26. The PCB 44 is configured to wear with wear of the sensor 30, and, in particular, wear of the wear surface side 23 of the liner body 26. The sensor 30 is responsive to wear along its length and, therefore, is configured to detect wear of the liner body 26. As previously described, each sensor 30 may also be configured to sense one or more of temperature, strain, pressure or vibration. Therefore, each sensor 30 is configured to detect the temperature, strain, pressure or vibration associated with the liner body 26 in the region of the sensor 30. This measurement is indicative of wear of the liner body 26 in the region of the respective sensor 30.

The sensing circuit 42 is monitored by, for example, measuring a potential difference, current and/or impedance between the ends 48 and 50 of the sensing circuit 42. As the sensor 30 degrades in response to wear of the wear surface side 23 of the liner body 26, the sensing circuit 42 also degrades. In particular, the resistors 46 are sequentially worn away altering the overall impedance of the circuit 42 as each resistor 46 is destroyed. Therefore, the change in the impedance indicates degradation of the respective sensor 30, and thus wear of the wear surface side 23 of the liner body 26. The wear rate of the liner body 26 can be determined by associating the wear between two or more resistors 46 with a measured time frame. As the liner body 26 comprises a plurality of sensors 30, the wear of the liner body 26 can be mapped across the wear surface side 23.

Figure 8:
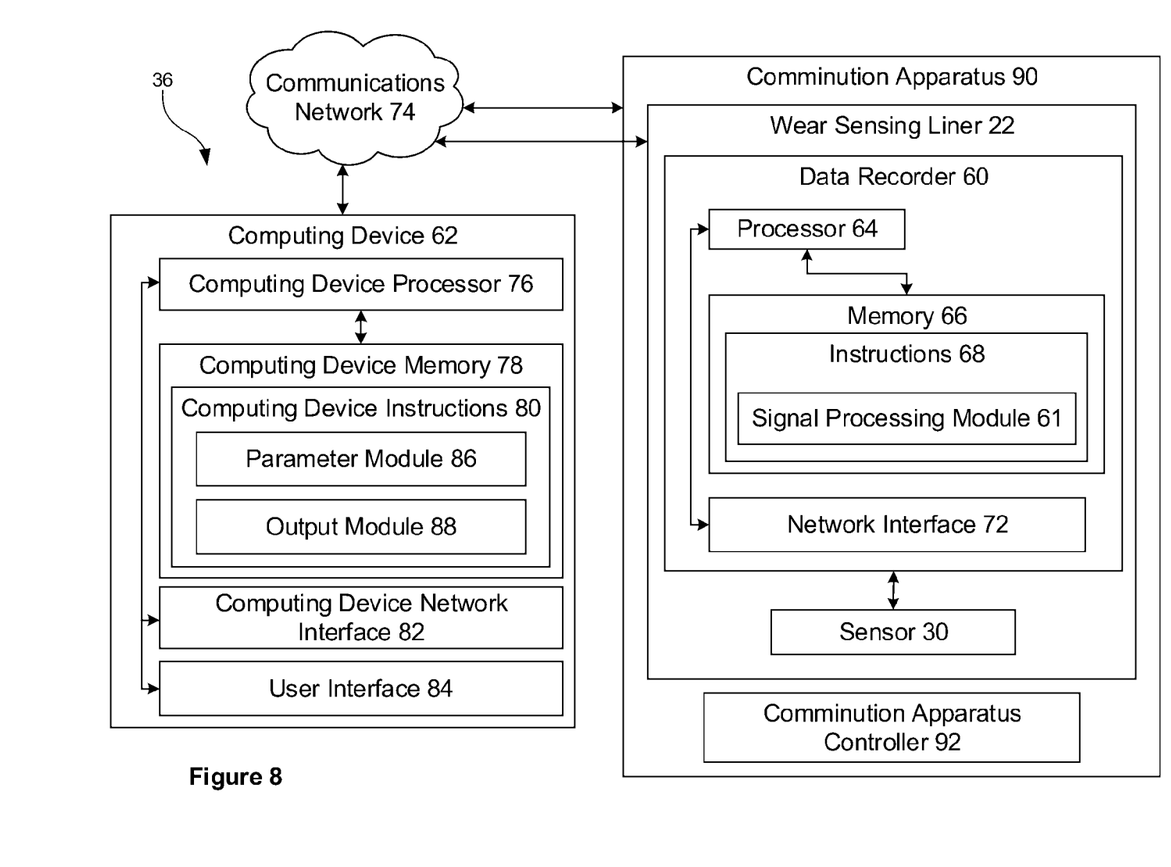
FIG. 8 shows a block diagram of an embodiment of a wear sensing system for a comminution apparatus.

The wear sensing liner 22 is associated with a data recorder 60 (shown in FIG. 8). Each sensor 30 is connected to the data recorder 60. The data recorder 60 is configured to record the signal from each sensor 30 for transmission to a computing device 62 which may be a remote device.

The data recorder 60 comprises a processor 64, for processing software instructions, and a memory 66. The processor 64 is configured to execute instructions 68 stored in the memory 66 to cause the data recorder 60 to perform certain functionality, as described in more detail below. The instructions 68 may be in the form of program instructions or instruction program code. The processor 64 comprises a microprocessor, central processing unit (CPU), application specific instruction set processor (ASIP), application specific integrated circuit (ASIC) or another processor capable of reading and executing instructions. The memory 66 comprises one or more volatile or non-volatile memory types for storing recorded data. For example, memory 66 may comprise one or more of random access memory (RAM), read-only memory (ROM), electrically erasable programmable read-only memory (EEPROM) or flash memory.

The data recorder 60 is further configured to be ruggedized, allowing the data recorder 60 to operate reliably in harsh environments and conditions. Furthermore, the data recorder 60 may be configured to receive and record the signal from each sensor 30 in real time or near real time. This allows for the provision of a continuous data stream that is representative of in situ use of the wear sensing liner 22, as well as a set of historic data for reference.

The data recorder 60 comprises a network interface 72. The network interface 72 allows the data recorder 60 to communicate with the computing device 62 over a communications network 74. Examples of a suitable communications network 74 include a cloud server network, wired or wireless connection (such as an Internet connection), Bluetooth™, Zigbee, or other near field radio communication technology, and/or physical media such as USB.

In an embodiment, the network interface 72 comprises an antenna (not shown). The antenna is configured to wirelessly transmit the signal from each sensor 30 to the computing device 62. In such embodiments, the computing device 62 is a remote, wireless device. The antenna is configured to transmit the signal according to any one of the wireless technology standards, such as Bluetooth®, Zigbee, IEEE 802.11ac, or the like.

As illustrated in FIG. 8, and as described above, the data recorder 60 comprises a signal processing module 61 forming a part of the processor 64. The signal processing module 61 processes signals output by each sensor 30 to enable the processor 64 to determine the wear rate of the wear surface side 23 of the wear sensing liner 22.

Figure 5:
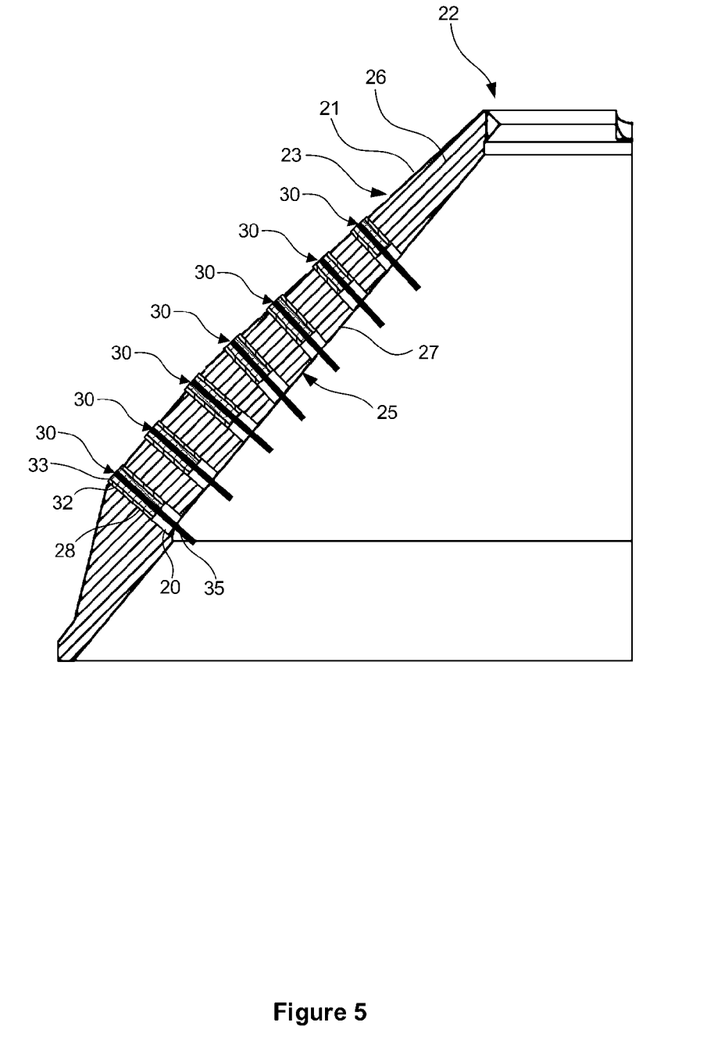
FIG. 5 shows a cross sectional view of a part of a third embodiment of a wear sensing liner configured as a mantle liner of a cone crusher.
Figure 6:
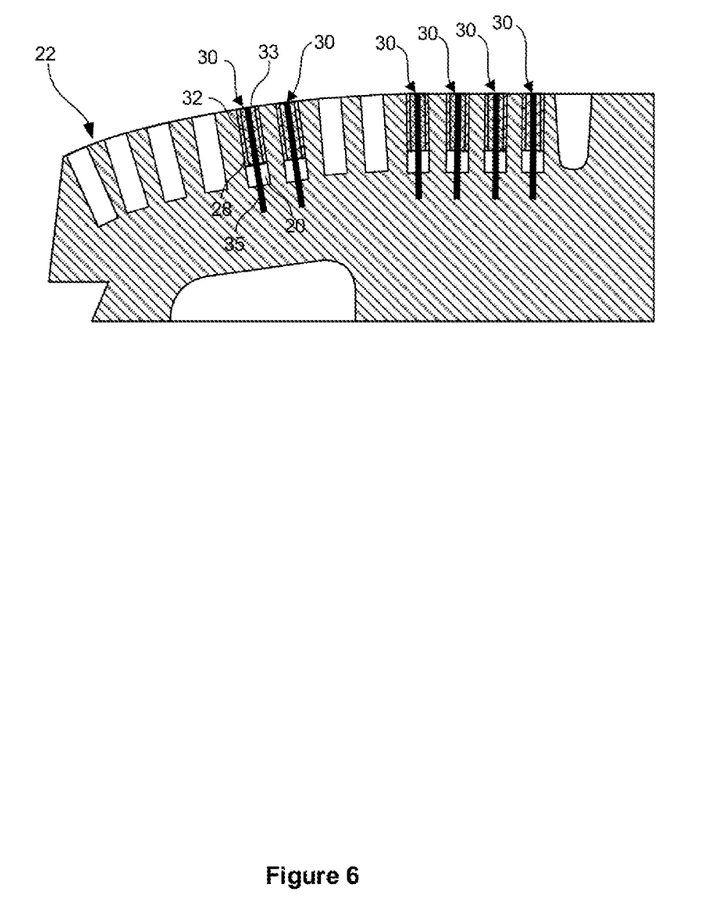
FIG. 6 shows a cross sectional view of a part of a fourth embodiment of a wear sensing liner configured as a jaw liner of a jaw crusher.
Figure 7:
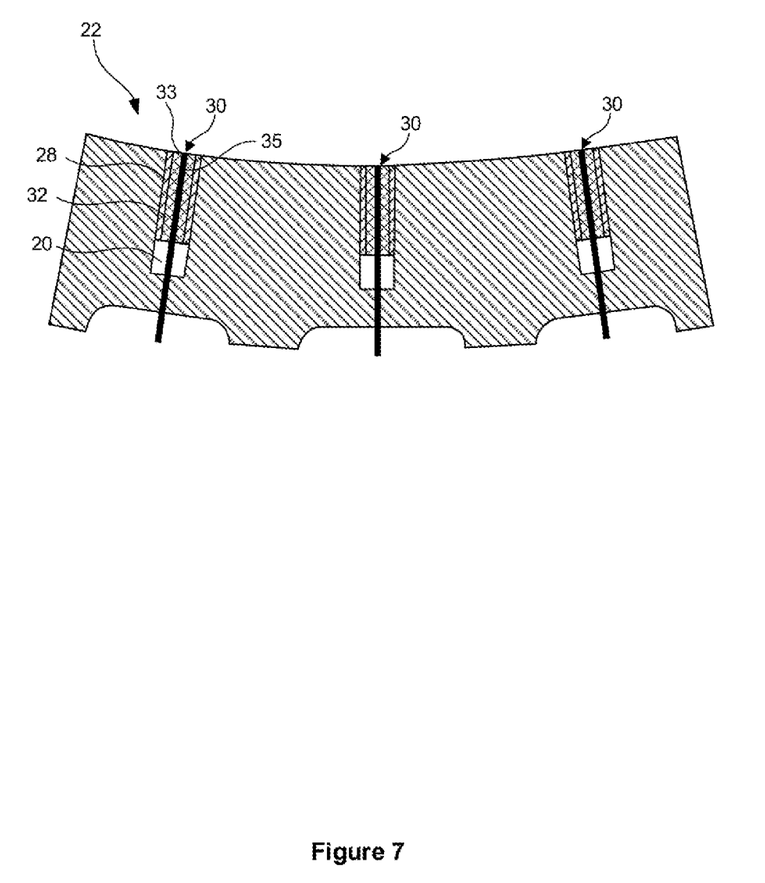
FIG. 7 shows a cross sectional view of a part of a fifth embodiment of a wear sensing liner configured as a concave liner of a gyratory crusher.

It will be appreciated by persons skilled in the art that the wear sensing liner 22 may be configured to be used with different types of comminution apparatuses (e.g. crushers), or for different portions of comminution apparatuses. For example, the wear sensing liner 22, as described with reference to FIG. 4, may be used as a wear sensing liner of a jaw crusher. FIG. 5 shows a wear sensing liner 22 configured as a mantle liner for a cone crusher. FIG. 6 shows a wear sensing liner 22 configured as a jaw liner for a jaw crusher. FIG. 7 shows a wear sensing liner 22 configured as a concave liner for a gyratory crusher.

A comminution apparatus 90 typically includes two crushing surfaces, one defined by a stationary component and the other defined by a movable component which is displaceable relative to the stationary component. Each component carries wear sensing liners 22, of the type described, to protect the components against wear. This may be the case, for example, with jaw crushers, cone crushers and gyratory crushers. For example, in the case of a cone crusher, the stationary component is the outer bowl or shell and the movable component is the cone which rotates eccentrically within the shell.

Generally, the stationary component of the comminution apparatus 90 is easier to access. Thus, the wear sensing liners 22 carried by the stationary component contain sensors 30 as described above with reference to FIGS. 1A and 1B of the drawings to be connected directly to the light source and associated signal processing circuitry. Conversely, the movable component of the comminution apparatus 90 is generally more difficult to access. The wear sensing liners 22 associated with the movable component may thus contain sensors 30 as described above with reference to FIG. 2 of the drawings. The sensors 30 associated with the movable component of the comminution apparatus 90 are able to communicate wirelessly with the relevant signal processing circuitry.

FIG. 8 illustrates an embodiment of a wear sensing system 36 which is operable to monitor the extent of wear and/or wear rate of the wear sensing liner 22.

The wear sensing system 36 comprises the wear sensing liner 22 and a computing device 62. In the illustrated embodiment, the computing device 62 is in the form of a remote device. It will be appreciated however, that the computing device 62 may be directly connected to the wear sensing liner 22 (e.g. by one or more wired connections). The wear sensing liner 22, as described above, is arranged to cover or line a crushing surface of a comminution apparatus 90. Each sensor 30 of the wear sensing liner 22 is configured to produce a signal representative of wear of the wear surface 21 of the liner body 26. Thus, a change in the signal output by each sensor 30 in response to mechanical degradation of the wear surface 21 during operation of the comminution apparatus 90 is representative of a change in the wear surface of the liner body 26.

The computing device 62 may be in the form of a desktop computer or a tablet computer, for example. The computing device 62 comprises a computing device processor 76 and a computing device memory 78. The computing device processor 76 is configured to execute computing device instructions 80 stored in the computing device memory 78 to cause the computing device 62 to perform certain functionality, as described in more detail below. The computing device instructions 80 may be in the form of program instructions or instruction program code. The computing device processor 76 comprises a microprocessor, central processing unit (CPU), application specific instruction set processor (ASIP), application specific integrated circuit (ASIC) or another processor capable of reading and executing instructions.

The computing device memory 78 comprises one or more volatile or non-volatile memory types. For example, the computing device memory 78 may comprise one or more of random access memory (RAM), read-only memory (ROM), electrically erasable programmable read-only memory (EEPROM) or flash memory.

The computing device 62 comprises a computing device network interface 82 which may be in the form of a wireless receiver. The computing device network interface 82 allows the computing device 62 to communicate with the data recorder 60 over the communications network 74. Where applicable, the computing device network interface 82 also allows the computing device 62 to communicate with the comminution apparatus 90 over the communications network 74.

The computing device 62 comprises a user interface 84 via which a user enters inputs to the computing device 62 and via which the user is able to monitor wear of the wear sensing liner 22. Thus, the user interface 84 comprises one or more user interface components, such as one or more of a display device, a haptic display, a keyboard, a mouse, a camera, a microphone, buttons, switches, discernible warning elements (such as audible or visual warning devices), or the like.

As illustrated in FIG. 8, the computing device 62 comprises a parameter module 86. The parameter module 86 is configured to determine a rate of change of the physical parameter using the data produced by each sensor 30. That is, the parameter module 86 is configured to determine the wear rate of the wear sensing liner 22. The parameter module 86 is configured to determine an estimated remaining lifetime, or time to failure, of the wear sensing liner 22 using the data received from the data recorder 60.

The computing device 62 further comprises an output module 88. The output module 88 is configured to generate one or more outputs obtained from processing the data. For example, the output module 88 is configured to generate a visual representation of the physical parameter, rate of change of the physical parameter, and/or the estimated remaining lifetime, or time to failure, of the wear sensing liner 22, as will be described in more detail below. The output module 88 is further configured to generate an alarm based on the determined physical parameter, rate of change of the physical parameter, and/or estimated remaining lifetime, or time to failure, of the wear sensing liner 22. Still further, the output module 88 is configured to generate a control signal based on the determined physical parameter, rate of change of the physical parameter, and/or estimated remaining lifetime, or time to failure, of the wear sensing liner 22.

In an embodiment, the comminution apparatus 90 includes the wear sensing liner 22, as shown in FIG. 8. The comminution apparatus 90 thus comprises the wear sensing system 36. The comminution apparatus 90 comprises a comminution apparatus controller 92. The comminution apparatus controller 92 controls the comminution apparatus 90. In particular, the comminution apparatus controller 92 controls one or more operating parameters of the comminution apparatus 90 (e.g. its throughput). The comminution apparatus controller 92 operates under the control of the computing device 62, which may activate and/or deactivate the comminution apparatus 90 upon instruction. The comminution apparatus 90 is configured to communicate with the computing device 62 and/or the data recorder 60 using the communications network 74 if necessary.

As previously described, each sensor 30 is connected to the data recorder 60, and the data recorder 60 is configured to record the signal from each sensor 30. In particular, the data recorder 60 is configured to receive the signal from one or more of the sensors 30 as an input. The data recorder 60 generates wear data from the signal of each sensor 30 and stores the data in the memory 64. The data recorder 60 transmits the data to the computing device 62 over the communications network 74. The computing device 62 stores the data in the computing device memory 78.

The computing device 62 determines the wear rate of the liner body 26 from the data extracted from each signal. To determine the wear rate, the computing device processor 76 determines the depth, or thickness, of the liner body 26 in a region of a particular sensor 30 at a first time using the data. The computing device processor 76 executes the parameter module 86 to determine the depth of the liner body 26 using the data.

The computing device processor 76 compares the data to signal reference data to determine the depth of the liner body 26. The signal reference data is stored in the computing device memory 78. The signal reference data may comprise a signal look-up table. The signal look-up table may comprise known signals, or known signal reference information, and corresponding values of the depth of the liner body 26. Thus, when a particular signal is detected, the data is compared to the signal reference data to determine the depth of the liner body 26. The computing device processor 78 stores the determined depth of the liner body 26 in the computing device memory 78.

The computing device 62 generates a visual representation of the determined depth of the liner body 26 at the first time. The visual representation of depth may, for example, be displayed on the user interface 84. More particularly, the output module 88 generates the visual representation of the depth.

The computing device processor 76 then determines the depth in the region of the sensor 30 at a second time using the data, as previously described with reference to the depth determined at the first time.

The computing device 62 generates a visual representation of the determined depth of the liner body 26 at the second time which, once again, may be displayed on the user interface 84.

The computing device processor 76 determines the wear rate of the liner body 26, and therefore of the wear sensing liner 22 in the region of the sensor 30 by comparing the depth determined at the first time to the depth determined at the second time. The computing device 62 generates a visual representation of the determined wear rate of the liner body 26 which may be displayed on the user interface 84.

When the wear or wear rate of the liner body 26 reaches, or breaches, a threshold level, the computing device 62 generates an alarm, via the output module 88. The alarm is a discernible alarm and may comprise a visual alarm output, for example, displayed on the user interface 84 and/or an audio alarm. The computing device processor 76 thus compares the determined wear and/or wear rate to the relevant threshold level and causes the alarm to be generated when the wear is equal to or less than a wear threshold level or the wear rate is equal to or greater than a wear rate threshold level.

The wear of the liner body 26 may correspond to the determined depth of the liner body 26, and the threshold level may be a minimum allowable depth of the liner body 26. If the liner body 26 were to be allowed to wear beyond the minimum allowable depth, damage may be caused to the comminution apparatus 90 on which the wear sensing liner 22 is installed. Therefore, by generating the alarm when the wear is equal to or less than the wear threshold, the computing device 62 notifies the user that the liner body 26 depth is equal to or less than the wear threshold. Furthermore, by generating the alarm when the wear rate is equal to or greater than the wear rate threshold, the computing device 62 notifies the user that the wear rate of the liner body 26 will result in a reduced lifetime of the wear sensing liner 22. The user may, for example, deactivate the comminution apparatus 90, or adjust an operating parameter of the comminution apparats 90 based on this alarm, thereby mitigating damage to the comminution apparatus 90.

Wear sensing liners 22 may be difficult to acquire on short notice, and may require significant planning to replace. This is because the comminution apparatus 90 is shut down to facilitate replacement of the wear sensing liner 22. By generating the alarm, the computing device 62 provides advance notice that the wear sensing liner 22 is going need to be replaced. This can allow the user sufficient time to plan a shutdown of the comminution apparatus 90 to replace the wear sensing liner 22. This minimises the operational disruption of the deactivation, by allowing the user to redirect rock material to other comminution apparatuses, or stockpile rock material efficiently during the deactivation.

In addition, or instead, the computing device 62 generates and transmits a control signal configured to control the comminution apparatus 90 when the wear and/or wear rate reaches, or breaches, the relevant threshold level. The computing device 62 may transmit the control signal to the comminution apparatus controller 92. The control signal may deactivate the comminution apparatus 90. Alternatively, the control signal may adjust an operating parameter of the comminution apparatus 90. For example, the control signal may be configured to cause a reduction in the throughput of the comminution apparatus 90. As previously described, this advantageously mitigates damage to the comminution apparatus 90.

The computing device 62 is configured to determine an estimated remaining lifetime of the liner body 26, and therefore of the wear sensing liner 22. The estimated remaining lifetime may also be referred to as the estimated time to failure of the wear sensing liner 22. The computing device 62 uses the determined wear and/or wear rate of the liner body 26 to determine the estimated remaining lifetime of the wear sensing liner 22.

The computing device 62 generates a visual representation of the estimated remaining lifetime of the wear sensing liner 22 which is displayed on the user interface 84. Further, the computing device 62 generates an alarm based on the determined estimated remaining lifetime. The computing device 62 generates the alarm when the determined estimated remaining lifetime is equal to or less than a lifetime threshold. The alarm may comprise a visual alarm output, for example, displayed on the user interface 84 and/or an audio alarm. In an embodiment, the computing device 62 generates and transmit a control signal to control the comminution apparatus 90 when the determined estimated remaining lifetime is equal to or less than the lifetime threshold. In particular, the computing device 62 may transmit the control signal to the comminution apparatus controller 92 either to deactivate the comminution apparatus 90 or to adjust an operating parameter of the comminution apparatus 90. For example, the control signal may be configured to cause a reduction in the throughput of the comminution apparatus 90. As previously described, this advantageously mitigates damage to the comminution apparatus 90.

Although determining the depth of the liner body 26 in the region of the sensor 30, the wear of the liner body 26, the wear rate of the liner body 26 and the estimated remaining lifetime of the liner body 26 have been described with reference to the signal produced by the sensor 30 being representative of the length of the sensor 30, it will be appreciated that one or more of these can also be determined where the signal produced by the sensor 30 is indicative of the temperature at the distal end 33 of the sensor 30 or at an intermediate portion along the sensor's 30 length, the strain at the distal end 33 of the sensor 30 or at an intermediate portion along the sensor's 30 length, the pressure at the distal end 33 of the sensor 30, the pressure at an intermediate portion along the sensor's 30 length, vibration at the distal end 33 of the sensor 30, or vibration at an intermediate portion along the sensor's 30 length.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A wear sensing liner for a comminution apparatus, the wear sensing liner comprising:
   a liner body comprising;
      a wear surface side defining a wear surface;
      an opposed, operatively rear surface side;
      a metal insert attached to the liner body and extending at least part way through the liner body, the metal insert being formed of a different material having a higher melting temperature than the material of the liner body; and
      at least one sensor carried by the liner body, the at least one sensor being carried by the liner body to sense wear of the wear surface side of the liner body, the at least one sensor being configured to degrade in response to wear of the wear surface side of the liner body and to output a signal representative of the wear of the wear surface side of the liner body;
      wherein the at least one sensor comprises a rigid sleeve configured to mount the at least one sensor to the liner body, and
      wherein the metal insert comprises an interior surface contour that conforms to an exterior contour of the rigid sleeve, such that the rigid sleeve is accommodated in the metal insert when the at least one sensor is mounted to the liner body.

2. The wear sensing liner of claim 1, wherein a distal end of the at least one sensor is aligned with the wear surface of the liner body.

3. The wear sensing liner of claim 1, wherein the output signal corresponds to a physical parameter associated with the liner body, the physical parameter being representative of the wear of the wear surface side of the liner body.

4. The wear sensing liner of claim 3, wherein the physical parameter is a depth of the liner body in a region of the at least one sensor.

5. The wear sensing liner of claim 1, wherein the at least one sensor is an optical fibre sensor and in which the at least sensor comprises an optical fibre core; and the wear sensing liner further comprises an electromagnetic radiation source configured to generate light that is directed through the optical fibre core.

6. The wear sensing liner of claim 5, wherein the optical fibre core of the at least one sensor comprises at least one dielectric mirror located at a known position along a length of the optical fibre core and the signal output by the at least one sensor comprises reflected light.

7. The wear sensing liner of claim 1, wherein the at least one sensor comprises a printed circuit board comprising a sensing circuit configured to wear with wear of the liner body, the sensing circuit comprising a plurality of impedance elements arranged in parallel and positioned at known positions along a length of the at least one sensor.

8. The wear sensing liner of claim 1, wherein the at least one sensor is configured to be received within an opening defined by the liner body.

9. The wear sensing liner of claim 1, wherein the at least one sensor is secured to the metal insert with a mechanical connection or an adhesive.

10. The wear sensing liner of claim 1, comprising a plurality of sensors, wherein the plurality of sensors are arranged in an array with respect to the liner body so as to indicate mechanical degradation across the liner body.

11. The wear sensing liner of claim 1, comprising a data recorder configured to communicate with the at least one sensor, the data recorder comprising:
- a processor; and
- a memory storing program instructions accessible by the processor, and configured to cause the processor to:
- determine data representative of wear of the liner body extracted from the signal, and
- store the data in the memory.

12. The wear sensing liner of claim 1, wherein the insert is attached to the liner body by a mechanical connection, by adhesive or by a bond formed by casting the liner body around the metal insert.

13. A comminution apparatus comprising the wear sensing liner of claim 1.

14. A wear sensing system for a comminution apparatus, comprising:
- the wear sensing liner of claim 1; and
- a computing device;
- wherein the wear sensing liner is configured to communicate with the computing device using a communications network.

15. The wear sensing system of claim 14, wherein the computing device is configured to determine at least one of:
- an indication of wear of the wear sensing liner;
- a wear rate of the wear sensing liner, and
- an estimated remaining lifetime of the wear sensing liner; and
- wherein the computing device is configured to generate an alarm when at least one of the following occurs:
  - the determined wear is equal to or less than a wear threshold;
  - the wear rate is equal to or greater than a wear rate threshold; and
  - the estimated remaining lifetime is equal to or less than a lifetime threshold.

16. The wear sensing system of claim 15, wherein the computing device is configured to transmit a control signal that is configured to deactivate the comminution apparatus or change a comminution apparatus operating parameter, to a comminution controller of the comminution apparatus in response to at least one of the following;
- the determined wear is equal to or less than a wear threshold;
- the wear rate is equal to or greater than a wear rate threshold; and
- the estimated remaining lifetime is equal to or less than a lifetime threshold;

thereby deactivating the comminution apparatus, or changing the comminution apparatus operating parameter.

17. The wear sensing system of claim 14, wherein the computing device is configured to generate a control signal configured to deactivate the comminution apparatus or change a comminution apparatus operating parameter.

18. A comminution apparatus comprising the wear sensing system of claim 14.

19. A method of manufacturing a wear sensing liner, comprising:
- providing a metal insert configured to extend at least part way through the wear sensing liner; and
- fabricating a liner body in which the metal insert is received such that the metal insert extends at least part way through the liner body from a wear surface side thereof defining a wear surface towards an opposed, operatively rear surface side of the liner body;
- wherein the metal insert comprises an interior surface contour that conforms to an exterior contour of a rigid sleeve of a sensor such that the rigid sleeve is accommodated in the metal insert when the sensor is mounted to the liner body, wherein the metal insert is formed of a different material having a higher melting temperature than the liner body.

20. The method of claim 19, wherein the liner body is fabricated by casting, both the metal insert and the liner body comprise metal materials.

* * * * *